US006679332B2

(12) United States Patent
Vinegar et al.

(10) Patent No.: US 6,679,332 B2
(45) Date of Patent: *Jan. 20, 2004

(54) PETROLEUM WELL HAVING DOWNHOLE SENSORS, COMMUNICATION AND POWER

(75) Inventors: Harold J. Vinegar, Houston, TX (US); Robert Rex Burnett, Katy, TX (US); William Mountjoy Savage, Houston, TX (US); Frederick Gordon Carl, Jr., Houston, TX (US)

(73) Assignee: Shell Oil Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/769,046

(22) Filed: Jan. 24, 2001

(65) Prior Publication Data

US 2002/0043369 A1 Apr. 18, 2002

Related U.S. Application Data

(60) Provisional application No. 60/186,531, filed on Mar. 2, 2000, provisional application No. 60/186,527, filed on Mar. 2, 2000, provisional application No. 60/186,505, filed on Mar. 2, 2000, provisional application No. 60/186,504, filed on Mar. 2, 2000, provisional application No. 60/186,503, filed on Mar. 2, 2000, provisional application No. 60/186,394, filed on Mar. 2, 2000, provisional application No. 60/186,393, filed on Mar. 2, 2000, provisional application No. 60/186,382, filed on Mar. 2, 2000, provisional application No. 60/186,381, filed on Mar. 2, 2000, provisional application No. 60/186,380, filed on Mar. 2, 2000, provisional application No. 60/186,379, filed on Mar. 2, 2000, provisional application No. 60/186,378, filed on Mar. 2, 2000, provisional application No. 60/186,377, filed on Mar. 2, 2000, provisional application No. 60/186,376, filed on Mar. 2, 2000, provisional application No. 60/181,322, filed on Feb. 9, 2000, provisional application No. 60/178,001, filed on Jan. 24, 2000, provisional application No. 60/178,000, filed on Jan. 24, 2000, provisional application No. 60/177,999, filed on Jan. 24, 2000, provisional application No. 60/177,998, filed on Jan. 24, 2000, provisional application No. 60/177,997, filed on Jan. 24, 2000, and provisional application No. 60/177,883, filed on Jan. 24, 2000.

(51) Int. Cl.[7] .............................................. E21B 34/06

(52) U.S. Cl. .................... 166/373; 166/53; 166/65.1; 166/369

(58) Field of Search ...................... 166/250.15, 250.03, 166/372, 53, 369, 373, 65.1, 66.6

(56) References Cited

U.S. PATENT DOCUMENTS 525,663 A  9/1894 Mottinger (List continued on next page.)

FOREIGN PATENT DOCUMENTS

EP  28296  5/1981  ............ E21B/47/12

(List continued on next page.)

OTHER PUBLICATIONS

Brown.Connolizo and Robertson, West Texas Oil Lifting Short Course and H. W. Winkler, "Misunderstood or overlooked Gas–Lift Design and Equipment Considerations," SPE, p. 351 (1994).

(List continued on next page.)

*Primary Examiner*—David Bagnell
*Assistant Examiner*—Daniel P Stephenson

(57) ABSTRACT

A petroleum well has an electronic module and a number of sensors which communicate with the surface using the tubing string and casing as conductors. Induction chokes at the surface and downhole electrically impede AC flow through the (tubing or casing if so configured) with the resulting voltage potential useful for power and communication. A high bandwidth, adaptable spread spectrum communications system is used to communicate between the downhole electronics module and a surface master spread spectrum modem. Downhole sensors, such as pressure, temperature, acoustic and seismic sensors accurately assess downhole physical conditions. In a preferred form, the electronics module and sensors are wireline insertable and retrievable into a side pocket mandrel in the tubing string. Permanent downhole sensors that can communicate with the surface allow such diverse applications as optimizing well and field performances, monitoring and assessing the geophysics of the fomrations around the well, assessing well and reservoir reserves, assessing reservoir conditions.

20 Claims, 9 Drawing Sheets

U.S. PATENT DOCUMENTS

| | | | |
|---|---|---|---|
| 2,917,004 A | 12/1959 | Davis et al. | |
| 3,083,771 A | 4/1963 | Chapman | |
| 3,247,904 A | 4/1966 | Wakefield Jr. | |
| 3,427,989 A | 2/1969 | Bostock et al. | |
| 3,566,963 A | 3/1971 | Blackledge | 166/189 |
| 3,602,305 A | 8/1971 | Kisling, III | 116/134 |
| 3,732,728 A | 5/1973 | Fitzpatrick | 73/151 |
| 3,793,632 A | 2/1974 | Still | 340/18 |
| 3,814,545 A | 6/1974 | Waters | 417/90 |
| 3,837,618 A | 9/1974 | Juhel | 251/129 |
| 3,980,826 A | 9/1976 | Widmer | 178/68 |
| 4,068,717 A | 1/1978 | Needham | 166/272 |
| 4,087,781 A | 5/1978 | Grossi et al. | 340/18 |
| 4,295,795 A | 10/1981 | Gass et al. | 417/111 |
| 4,393,485 A | 7/1983 | Redden | 367/25 |
| 4,468,665 A | 8/1984 | Thawley et al. | 340/853.2 |
| 4,545,731 A | 10/1985 | Canalizo et al. | 417/86 |
| 4,576,231 A | 3/1986 | Dowling et al. | 166/24 |
| 4,578,675 A | 3/1986 | MacLeod | 340/855 |
| 4,596,516 A | 6/1986 | Scott et al. | 417/58 |
| 4,630,243 A | 12/1986 | MacLeod | 367/35 |
| 4,648,471 A | 3/1987 | Bordon | 175/4.55 |
| 4,662,437 A | 5/1987 | Renfro | 166/65.1 |
| 4,681,164 A | 7/1987 | Stacks | 166/304 |
| 4,709,234 A | 11/1987 | Forehand et al. | 340/856 |
| 4,738,313 A | 4/1988 | McKee | 166/372 |
| 4,739,325 A | 4/1988 | MacLeod | 340/854 |
| 4,839,644 A | 6/1989 | Safinya et al. | 340/854 |
| 4,886,114 A | 12/1989 | Perkins et al. | 166/65.1 |
| 4,901,069 A | 2/1990 | Veneruso | 340/853 |
| 4,972,704 A | 11/1990 | Wellington et al. | 73/152.18 |
| 4,981,173 A | 1/1991 | Perkins et al. | 166/66.4 |
| 5,001,675 A | 3/1991 | Woodward | 367/13 |
| 5,008,664 A | 4/1991 | More et al. | 340/854 |
| 5,130,383 A | 7/1992 | Yoshino et al. | 166/66.4 |
| 5,130,706 A | 7/1992 | Van Steenwyk | 340/854.6 |
| 5,134,285 A | 7/1992 | Perry et al. | 250/269.3 |
| 5,160,925 A | 11/1992 | Dailey et al. | 340/853.3 |
| 5,162,740 A | 11/1992 | Jewell | 324/347 |
| 5,172,717 A | 12/1992 | Boyle et al. | 137/155 |
| 5,176,164 A | 1/1993 | Boyle | 137/155 |
| 5,191,326 A | 3/1993 | Montgomery | 344/855.5 |
| 5,246,860 A | 9/1993 | Hutchins et al. | 436/27 |
| 5,251,328 A | 10/1993 | Shaw | 455/73 |
| 5,257,663 A | 11/1993 | Pringle et al. | 166/66.4 |
| 5,267,469 A | 12/1993 | Espinoza | 73/40.5 |
| 5,278,758 A | 1/1994 | Perry et al. | 702/8 |
| 5,331,318 A | 7/1994 | Montgomery | 340/855.4 |
| 5,353,627 A | 10/1994 | Diatschenko et al. | 73/19.03 |
| 5,358,035 A | 10/1994 | Grudzinski | 166/53 |
| 5,367,694 A | 11/1994 | Ueno | 395/800 |
| 5,394,141 A | 2/1995 | Soulier | 340/854.4 |
| 5,396,232 A | 3/1995 | Mathieu et al. | 340/854.5 |
| 5,425,425 A | 6/1995 | Bankston et al. | 340/377 |
| 5,447,201 A | 9/1995 | Mohn | 166/375 |
| 5,458,200 A | 10/1995 | Lagerlef et al. | 166/372 |
| 5,467,083 A | 11/1995 | McDonald et al. | 340/854.6 |
| 5,473,321 A | 12/1995 | Goodman et al. | 340/854.9 |
| 5,493,288 A | 2/1996 | Henneuse | 340/854.4 |
| 5,531,270 A | 7/1996 | Fletcher et al. | 166/53 |
| 5,561,245 A | 10/1996 | Georgi et al. | 73/152.02 |
| 5,574,374 A | 11/1996 | Thompson et al. | 324/338 |
| 5,576,703 A | 11/1996 | NacLeod et al. | 340/854.4 |
| 5,587,707 A | 12/1996 | Dickie et al. | 340/870.09 |
| 5,592,438 A | 1/1997 | Rorden et al. | 367/83 |
| 5,662,165 A | 9/1997 | Tubel et al. | 166/250.01 |
| 5,723,781 A | 3/1998 | Pruett et al. | 73/152.18 |
| 5,730,219 A | 3/1998 | Tubel et al. | 166/250.1 |
| 5,745,047 A | 4/1998 | Van Gisbergen et al. | 340/853.1 |
| 5,782,261 A | 7/1998 | Becker et al. | 137/155 |
| 5,797,453 A | 8/1998 | Hisaw | 166/117.5 |
| 5,881,807 A | 3/1999 | B.o slashed.e et al. | 166/100 |
| 5,883,516 A | 3/1999 | Van Steenwyk et al. | 324/366 |
| 5,887,657 A | 3/1999 | Bussear et al. | 166/336 |
| 5,896,924 A | 4/1999 | Carmody et al. | 166/53 |
| 5,934,371 A | 8/1999 | Bussear et al. | 166/53 |
| 5,937,945 A * | 8/1999 | Bussear et al. | 166/250.15 |
| 5,941,307 A | 8/1999 | Tubel | 166/313 |
| 5,955,666 A | 9/1999 | Mullins | 73/52.18 |
| 5,959,499 A | 9/1999 | Khan et al. | 330/149 |
| 5,960,883 A | 10/1999 | Tubel et al. | 166/313 |
| 5,963,090 A | 10/1999 | Fukuchi | 330/149 |
| 5,971,072 A | 10/1999 | Huber et al. | 166/297 |
| 5,975,204 A | 11/1999 | Tubel et al. | 166/250.15 |
| 5,995,020 A | 11/1999 | Owens et al. | 340/854.9 |
| 6,012,015 A | 1/2000 | Tubel | 702/6 |
| 6,012,016 A | 1/2000 | Bilden et al. | 702/12 |
| 6,070,608 A | 6/2000 | Pringle | 137/155 |
| 6,123,148 A | 9/2000 | Oneal | 166/118 |
| 6,148,915 A | 11/2000 | Mullen et al. | 166/278 |
| 6,192,983 B1 | 2/2001 | Neuroth et al. | 166/250.15 |
| 6,208,586 B1 | 3/2001 | Rorden et al. | 367/35 |
| 6,334,486 B1 | 1/2002 | Carmody et al. | 166/53 |
| 6,484,800 B2 | 11/2002 | Carmody et al. | 166/53 |

FOREIGN PATENT DOCUMENTS

| | | | |
|---|---|---|---|
| EP | 339825 | 11/1989 | E21B/47/12 |
| EP | 492856 | 7/1992 | H04B/1/62 |
| EP | 641916 A2 | 3/1995 | E21B/33/124 |
| EP | 681090 | 11/1995 | E21B/47/18 |
| EP | 697500 A2 | 2/1996 | E21B/49/00 |
| EP | 732053 A1 | 9/1996 | A21C/9/04 |
| EP | 721053 A1 * | 10/1996 | |
| EP | 919696 A2 | 6/1999 | E21B/47/12 |
| EP | 922835 A3 | 6/1999 | E21B/43/14 |
| EP | 930518 A2 | 7/1999 | G01V/3/12 |
| EP | 964134 A2 | 12/1999 | E21B/47/12 |
| EP | 972909 A2 | 1/2000 | E21B/44/00 |
| EP | 999341 A2 | 5/2000 | E21B/33/124 |
| FR | 2677134 | 12/1992 | E21B/47/12 |
| GB | 2083321 A | 3/1982 | H04B/5/00 |
| GB | 2325949 A | 12/1998 | E21B/43/12 |
| GB | 2327695 | 2/1999 | E21B/43/12 |
| GB | 2338253 A | 12/1999 | E21B/47/12 |
| WO | 93/26115 | 12/1993 | H04N/1/40 |
| WO | 96/00836 | 1/1996 | E21B/47/12 |
| WO | 96/24747 | 5/1996 | E21B/43/12 |
| WO | PCT/EP97/01621 | 3/1997 | |
| WO | 97/37103 | 10/1997 | E21B/47/01 |
| WO | 98/20233 | 5/1998 | E21B/43/40 |
| WO | 99/57417 | 11/1999 | E21B/41/00 |
| WO | 99/60247 | 11/1999 | E21B/43/12 |
| WO | 00/04275 | 1/2000 | E21B/47/01 |
| WO | 00/ 04275 | 1/2000 | E21B/47/01 |
| WO | 00/37770 | 6/2000 | |
| WO | 01/20126 A2 | 3/2001 | E21B/43/12 |
| WO | 01/55555 A1 | 8/2001 | E21B/47/12 |

OTHER PUBLICATIONS

Der Spek, Alex, and Aliz Thomas, "Neural–Net Identification of Flow Regime with Band Spectra of Flow–Generated Sound", SPE Reservoir Eva. & Eng. 2 (6) Dec. 1999, pp. 489–498.

Sakata et al., "Performance Analysis of Long Distance Transmitting of Magnetic Signal on Cylindrical Steel Rod", IEEE Translation Journal on magnetics in Japan, vol. 8, No.2. Feb. 1993,, pp. 102–106.

Otis Engineering, Aug. 1980, "Heavy Crude Lift System", Field Development Report, OEC 5228, Otis Corp., Dallas, Texas, 1980.

* cited by examiner

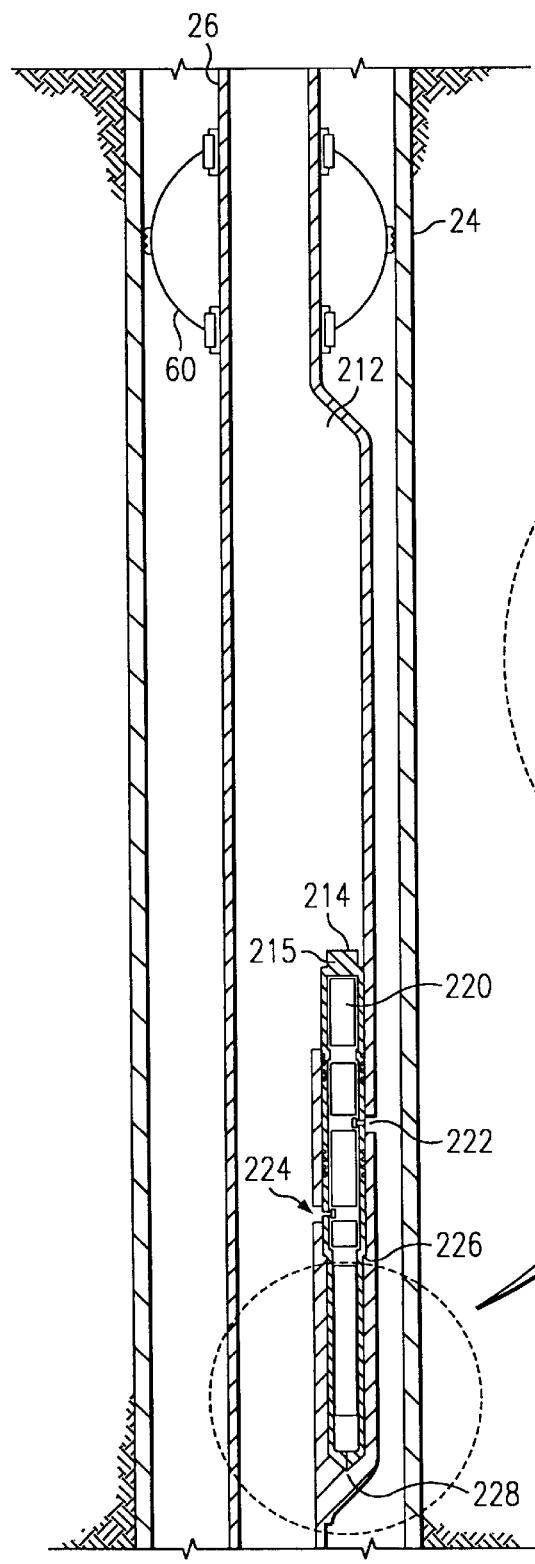
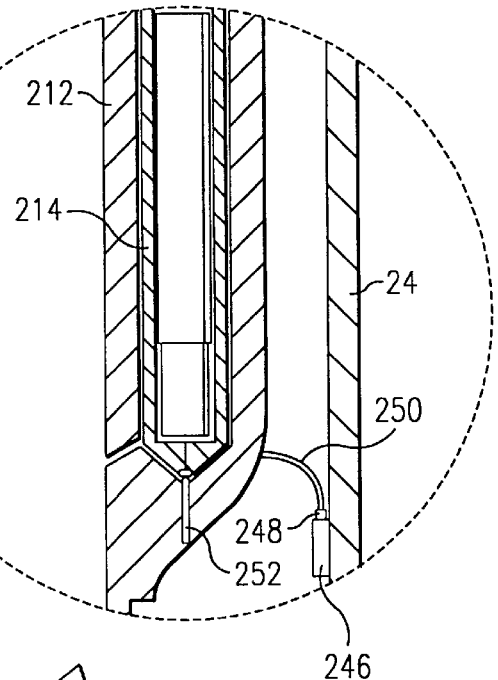
FIG. 11
FIG. 9

PETROLEUM WELL HAVING DOWNHOLE SENSORS, COMMUNICATION AND POWER

CROSS REFERENCES TO RELATED APPLICATIONS

This application claims the benefit of the U.S. Provisional Applications in the following table, all of which are hereby incorporated by reference:

U.S. PROVISIONAL APPLICATIONS

| T&K # | Ser. No. | Title | Filing Date |
|---|---|---|---|
| TH 1599 | 60/177,999 | Toroidal Choke Inductor for Wireless Communication and Control | Jan. 24, 2000 |
| TH 1599x | 60/186,376 | Toroidal Choke Inductor for Wireless Communication and Control | Mar. 2, 2000 |
| TH 1600 | 60/178,000 | Ferromagnetic Choke in Wellhead | Jan. 24, 2000 |
| TH 1600x | 60/186,380 | Ferromagnetic Choke in Wellhead | Mar. 2, 2000 |
| TH 1601 | 60/186,505 | Reservoir Production Control from Intelligent Well Data | Mar. 2, 2000 |
| TH 1602 | 60/178,001 | Controllable Gas-Lift Well and Valve | Jan. 24, 2000 |
| TH 1603 | 60/177,883 | Permanent, Downhole, Wireless, Two-Way Telemetry Backbone Using Redundant Repeater, Spread Spectrum Arrays | Jan. 24, 2000 |
| TH 1668 | 60/177,998 | Petroleum Well Having Downhole Sensors, Communication, and Power | Jan. 24, 2000 |
| TH 1669 | 60/177,997 | System and Method for Fluid Flow Optimization | Jan. 24, 2000 |
| TS6185 | 60/181,322 | Optimal Predistortion in Downhole Communications System | Feb. 9, 2000 |
| TH 1671 | 60/186,504 | Tracer Injection in a Production Well | Mar. 2, 2000 |
| TH 1672 | 60/186,379 | Oilwell Casing Electrical Power Pick-Off Points | Mar. 2, 2000 |
| TH 1673 | 60/186,375 | Controllable Production Well Packer | Mar. 2, 2000 |
| TH 1674 | 60/186,382 | Use of Downhole High Pressure Gas in a Gas Lift Well | Mar. 2, 2000 |
| TH 1675 | 60/186,503 | Wireless Smart Well Casing | Mar. 2, 2000 |
| TH 1677 | 60/186,527 | Method for Downhole Power Management Using Energization from Distributed Batteries or Capacitors with Reconfigurable Discharge | Mar. 2, 2000 |
| TH 1679 | 60/186,393 | Wireless Downhole Well Interval Inflow and Injection Control | Mar. 2, 2000 |
| TH 1681 | 60/186,394 | Focused Through-Casing Resistivity Measurement | Mar. 2, 2000 |
| TH 1704 | 60/186,531 | Downhole Rotary Hydraulic Pressure for Valve Actuation | Mar. 2, 2000 |
| TH 1705 | 60/186,377 | Wireless Downhole Measurement and Control For Optimizing Gas Lift | Mar. 2, 2000 |
| TH 1722 | 60/186,381 | Well and Field Performance Controlled Downhole Chemical Injection | Mar. 2, 2000 |
| TH 1723 | 60/186,378 | Wireless Power and Communications Cross-Bar Switch | Mar. 2, 2000 |

The current application shares some specification and figures with the following commonly owned and concurrently filed applications in the following table, all of which are hereby incorporated by reference:

COMMONLY OWNED AND CONCURRENTLY FILED U.S. PATENT APPLICATIONS

| T&K # | Ser. No. | Title | Filing Date |
|---|---|---|---|
| TH 1600US | 09/769,048 | Induction Choke for Power Disribution in Piping Structure | Jan. 24, 2001 |
| TH 1602US | 09/768,705 | Controllable Gas-Lift Well and Valve | Jan. 24, 2001 |
| TH 1603US | 09/768,655 | Permanent, Downhole, Wireless, Two-Way Telemetry Backbone Using Redundant Repeaters | Jan. 24, 2001 |
| TH 1668US | 09/769,046 | Petroleum Well Having Downhole Sensors, Communication, and Power | Jan. 24, 2001 |
| TH 1669US | 09/768,656 | System and Method for Fluid Flow Optimization | Jan. 24, 2001 |

BACKGROUND OF THE INVENTION

1. Field of the Invention

The present invention relates generally to a petroleum well having a downhole modem, and in particular, to a downhole electronics module having one or more sensors which communicate with the surface, whereby the electronics module and sensors are powered using the tubing string and casing as a conductor.

2. Description of Related Art

Several methods have been devised to place electronics, sensors, or controllable valves downhole along an oil production tubing string, but all such known devices typically use an internal or external cable along the tubing string to provide power and communications downhole. It is, of course, highly undesirable and in practice difficult to use a cable along the tubing string either integral to the tubing string or spaced in the annulus between the tubing string and the casing. The use of a cable presents difficulties for well operators while assembling and inserting the tubing string into a borehole. Additionally, the cable is subjected to corrosion and heavy wear due to movement of the tubing string within the borehole. An example of a downhole communication system using a cable is shown in U.S. Pat. No. 4,839,644 describes a method and system for wireless two-way communications in a cased borehole having a tubing string. However, this system describes a communication scheme for coupling electromagnetic energy in a TEM mode using the annulus between the casing and the tubing. This inductive coupling requires a substantially nonconductive fluid such as crude oil in the annulus between the casing and the tubing. Therefore, the invention described in U.S. Pat. No. 4,839,644 has not been widely adopted as a practical scheme for downhole two-way communication. Another system for downhole communication using mud pulse telemetry is described in U.S. Pat. Nos. 4,648,471 and 5,887,657. Although mud pulse telemetry can be successful at low data rates, it is of limited usefulness where high data rates are required or where it is undesirable to have complex, mud pulse telemetry equipment downhole. Other methods of communicating within a borehole are described in U.S. Pat. Nos. 4,468,665; 4,578,675; 4,739,325; 5,130,706; 5,467,083; 5,493,288; 5,576,703; 5,574,374; and 5,883,516. Similarly, several permanent downhole sensors and control systems have been described in U.S. Pat. Nos. 4,972,704; 5,001,675; 5,134,285; 5,278,758; 5,662,165; 5,730,219; 5,934,371; and 5,941,307.

Side-pocket mandrels coupled to the production tubing are known for receiving wireline insertable and retrieval gas lift valves. Many gas lift wells have gas lift valves incorporated as an integral part of the tubing string, typically mounted to a tubing section. However, wireline replaceable side pocket mandrel type of gas lift valves have many advantages and are quite common (such as made by Camco or Weatherford.) See U.S. Pat. Nos. 5,782,261 and 5,797,453. Gas lift valves placed in a side pocket mandrel can be inserted and removed using a wireline and kickover tool either in top or bottom entry. Therefore, it is common practice in oilfield production to shut off production of the well every three to five years and use a wireline to replace gas lift valves. Often, an operator has a good estimate of which valves in the well have failed or degraded and need to be replaced.

It would, therefore, be a significant advance in the operation of gas lift wells if an alternative to the conventional bellows type valve were provided, in particular, if the tubing and casing could be used as communication and power conductors to control and operate such a gas lift valve. It would also be advantageous to have sensors and electronics downhole that are powered and communicate using the tubing string and the casing. These sensors and electronics could then be used cooperatively with the controllable gas lift valves to more efficiently operate the well.

All references cited herein are incorporated by reference to the maximum extent allowable by law. To the extent a reference may not be fully incorporated herein, it is incorporated by reference for background purposes and indicative of the knowledge of one of ordinary skill in the art.

BRIEF SUMMARY OF THE INVENTION

The problems outlined above with sensing and communicating downhole in an oil or gas well are addressed by the sensors and electronics module according to the system and method of the present invention. Broadly speaking, an oil or gas well includes a cased wellbore. The wellbore is cased with casing that extends substantially throughout the length of the bore and is held in place by cement between an exterior surface of the casing and the bore. A tubing string is positioned within and longitudinally extends within the casing. An electronics module is coupled to the tubing and includes one or more sensors that work cooperatively with the electronics module to monitor and determine various downhole conditions. Examples of the downhole conditions that can be monitored include tubing fluid pressure, tubing fluid temperature, annulus fluid pressure, annulus fluid temperature, fluid flow rates, valve positions, acoustic data, and seismic data. The electronics module and sensors are powered and communicate with the surface using the tubing and casing as conductors.

In more detail, a surface computer includes a master modem that can impart a communications signal to the tubing. The signal is preferably applied below a current limiting device such as a ferromagnetic choke positioned concentrically around the tubing. Low voltage alternating current (AC) power is also supplied to the tubing string below the current limiting device. In a preferred form, the casing is used as a ground return conductor, although an open hole ground to earth is also practical. The power and communications signals are received downhole by the electronics module and sensors. The electronics module includes a downhole slave modem for communicating the sensor measurements to the surface computer. Preferably, the electronics module and sensors are inserted as a wireline retrievable module into a side pocket mandrel in the tubing string. Alternatively, the electronic module and sensors may be mounted directly on the tubing.

The ferromagnetic chokes positioned around the tubing act as a series impedance to current flow in the tubing. In a preferred form, an upper ferromagnetic choke is placed around the tubing below a casing hanger near the top of the wellbore. A lower ferromagnetic choke is placed around the tubing downhole, and the electronics module is electrically coupled to the tubing just above the lower ferromagnetic choke. When power and communication signals are applied to the tubing below the upper ferromagnetic choke, the signal is effectively blocked from traveling beyond the lower or upper ferromagnetic chokes. This creates a potential between the tubing and a ground that is then used to power and communicate with the electronics module in the wellbore.

In a preferred form, the surface computer can be coupled via its surface master modem, not only to the downhole slave modem, but also to a variety of other data sources outside of the wellbore. These data sources could provide information, for example, on measurements of oil output and measurements of compressed gas input. The measurements could then by used by the surface computer to determine an optimum operating state of the oil well. In a preferred embodiment, the computer could then control the operation of the oil well by varying the amounts of compressed gas input, introducing needed chemicals into the oil well, or controlling downhole valves such as gas lift valves.

BRIEF DESCRIPTION OF THE DRAWINGS

FIG. 9 is an enlarged schematic front view of the side pocket mandrel, data monitoring pod, and sensors of FIG. 8.

FIG. 11 is a detail view of the data monitoring pod of FIG. 9 showing a geophone for monitoring acoustic data.

DETAILED DESCRIPTION OF THE INVENTION

Figure 1:
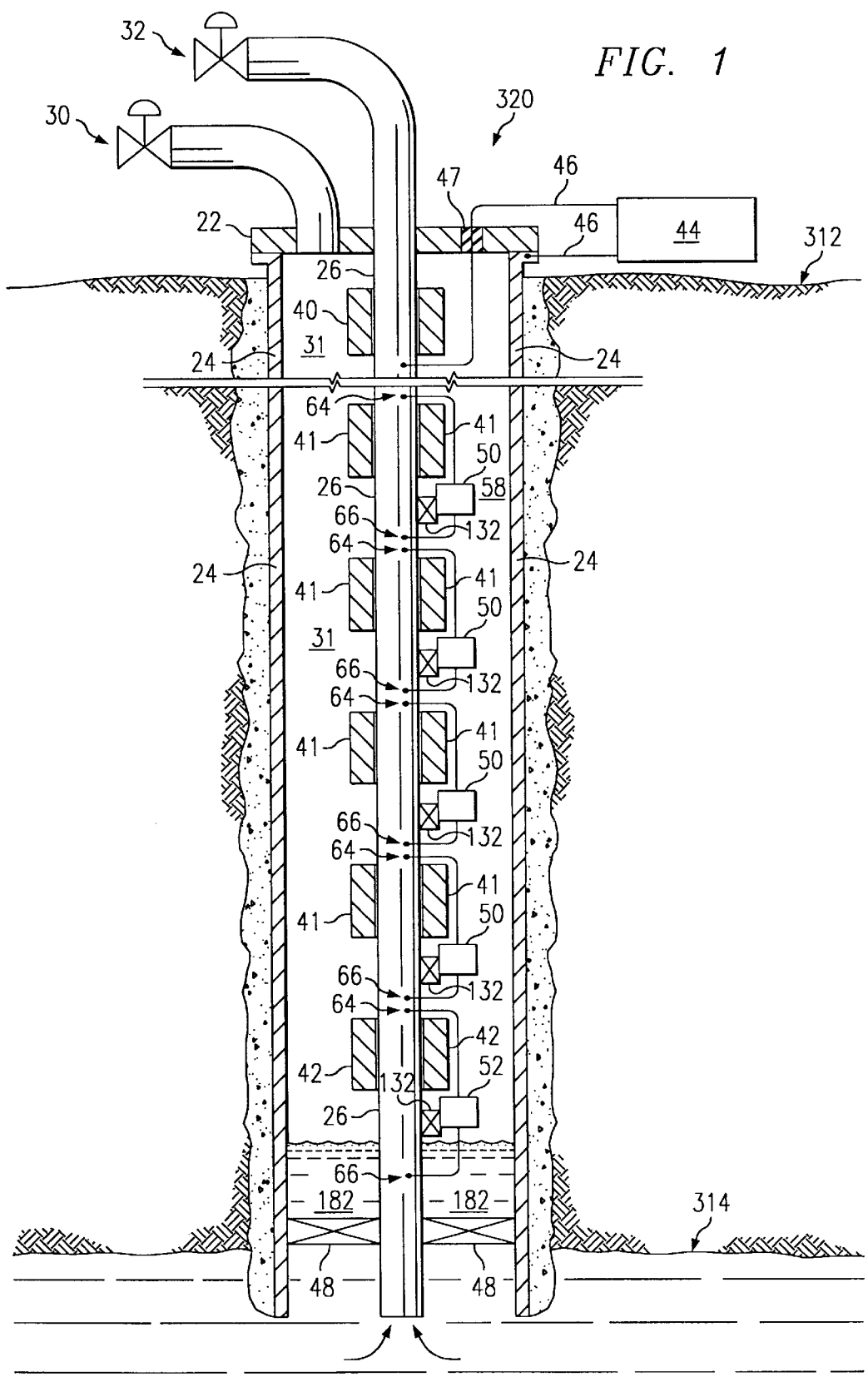
FIG. 1 is a schematic front view of a controllable gas lift well according to one embodiment of the present invention, the gas lift well having a tubing string and a casing positioned within a bore hole.

As used in the present application, a "valve" is any device that functions to regulate the flow of a fluid. Examples of valves include, but are not limited to, bellows-type gas-lift valves and controllable gas-lift valves, each of which may be used to regulate the flow of lift gas into a tubing string of a well. The internal workings of valves can vary greatly, and in the present application, it is not intended to limit the valves described to any particular configuration, so long as the valve functions to regulate flow. Some of the various types of flow regulating mechanisms include, but are not limited to, ball valve configurations, needle valve configurations, gate valve configurations, and cage valve configurations. The methods of installation for valves discussed in the present application can vary widely. Valves can be mounted downhole in a well in many different ways, some of which include tubing conveyed mounting configurations, side-pocket mandrel configurations, or permanent mounting configurations such as mounting the valve in an enlarged tubing pod.

The term "modem" is used generically herein to refer to any communications device for transmitting and/or receiving electrical communication signals via an electrical conductor (e.g., metal). Hence, the term is not limited to the acronym for a modulator (device that converts a voice or data signal into a form that can be transmitted)/demodulator (a device that recovers an original signal after it has modulated a high frequency carrier). Also, the term "modem" as used herein is not limited to conventional computer modems that convert digital signals to analog signals and vice versa (e.g., to send digital data signals over the analog Public Switched Telephone Network). For example, if a sensor outputs measurements in an analog format, then such measurements may only need to be modulated (e.g., spread spectrum modulation) and transmitted-hence no analog-to-digital conversion is needed. As another example, a relay/slave modem or communication device may only need to identify, filter, amplify, and/or retransmit a signal received.

The term "sensor" as used in the present application refers to any device that detects, determines, monitors, records, or otherwise senses the absolute value of or a change in a physical quantity. Sensors as described in the present application can be used to measure temperature, pressure (both absolute and differential), flow rate, seismic data, acoustic data, pH level, salinity levels, valve positions, or almost any other physical data.

The term "electronics module" in the present application refers to a control device. Electronics modules can exist in many configurations and can be mounted downhole in many different ways. In one mounting configuration, the electronics module is actually located within a valve and provides control for the operation of a motor within the valve. Electronics modules can also be mounted external to any particular valve. Some electronics modules will be mounted within side pocket mandrels or enlarged tubing pockets, while others may be permanently attached to the tubing string. Electronics modules often are electrically connected to sensors and assist in relaying sensor information to the surface of the well. It is conceivable that the sensors associated with a particular electronics module may even be packaged within the electronics module. Finally, the electronics module is often closely associated with, and may actually contain, a modem for receiving, sending, and relaying communications from and to the surface of the well. Signals that are received from the surface by the electronics module are often used to effect changes within downhole controllable devices, such as valves. Signals sent or relayed to the surface by the electronics module generally contain information about downhole physical conditions supplied by the sensors.

Similarly, in accordance with conventional terminology of oilfield practice, the descriptors "upper", "lower", "uphole" and "downhole" refer to relative distance along hole depth from the surface, which in deviated wells may or may not accord with absolute vertical placement measured with reference to the earth's center.

Also, the term "wireless" as used in this application means the absence of a conventional, insulated wire conductor e.g. extending from a downhole device to the surface. Using the tubing and/or casing as a conductor is considered "wireless."

Referring to FIG. 1 in the drawings, a petroleum well according to the present invention is illustrated. The petroleum well is a gas lift well 320 having a borehole extending from surface 312 into a production zone 314 that is located downhole. A production platform is located at surface 312 and includes a hanger 22 for supporting a casing 24 and a tubing string 26. Casing 24 is of the type conventionally employed in the oil and gas industry. The casing 24 is typically installed in sections and is cemented in borehole during well completion. Tubing string 26, also referred to as production tubing, is generally conventional comprising a plurality of elongated tubular pipe sections joined by threaded couplings at each end of the pipe sections. Production platform also includes a gas input throttle to permit the input of compressed gas into an annular space 31 between casing 24 and tubing string 26. Conversely, output valve 32 permits the expulsion of oil and gas bubbles from an interior of tubing string 26 during oil production.

An upper ferromagnetic choke 40 and lower ferromagnetic chokes 41, 42 are installed on tubing string 26 to act series impedances to alternating current flow. The size and material of ferromagnetic chokes 40, 41, 42 can be altered to vary the series impedance value. The section of tubing string 26 between upper choke 40 and lower choke 42 may be viewed as a power and communications path (see also FIG. 8). All chokes 40, 41, 42 are manufactured of high permeability magnetic material and are mounted concentric and external to tubing string 26. Chokes 40, 41, 42 are typically protected with shrink-wrap plastic and fiber-reinforced epoxy to provide electrical insulation and to withstand rough handling.

A computer and power source 44 having power and communication feeds 46 is disposed at the surface 312. Where feed 46 passes through the hanger 22 it is electrically isolated from the hanger by pressure feedthrough 47 located in hanger 22 and is electrically coupled to tubing string 26 below upper choke 40. The neutral connection 46 is connected to well casing 24. Thus power and communications signals are supplied to tubing string 26 from computer and power source 44, and casing 24 is regarded as neutral return for those signals.

A packer 48 is placed within casing 24 downhole below lower choke 42. Packer 48 is located above production zone 314 and serves to isolate production zone 314 and to electrically connect metal tubing string 26 to metal casing 24. Similarly, above surface 12, the metal hanger 22 (along with the surface valves, platform, and other production equipment) electrically connects metal tubing string 26 to metal casing 24. Typically, the electrical connections between tubing string 26 and casing 24 would not allow electrical signals to be transmitted or received up and down the well using tubing string 26 as one conductor and casing 24 as another conductor. However, upper ferromagnetic choke 40 acts as an impedance to AC flow, and thus directs AC signals down tubing 26. Intermediate chokes 41 and bottom choke 42 also impede current flow on the sections of tubing 26 where it passes through each choke, and thus AC carried on tubing 26 generates a potential difference on the tubing above and below each choke. This voltage is used to pass power and communication signals to downhole electronic modules 50 and 52. Chokes 41 and 42 also provide a means to couple communication signals generated by modules 50 and 52 onto the tubing, to provide a means for transmitting signals from downhole modules to surface equipment 44. In summary the chokes 40, 41, 42 around tubing string 26 alter the electrical characteristics of tubing 26, providing a system and method to conduct power and communication signals up and down the tubing and casing of gas lift well 320.

A plurality of motorized gas lift valves 132 are operatively connected to tubing string 26. The number of valves 132 disposed along tubing string 26 depends upon the depth of the well and the well lift characteristics. Each valve and its associated control module 50 is energized from the surface, and thus each valve may be individually addressed and its degree of opening controlled from the surface using commands sent from the surface over a communication link between a surface modem, and downhole modems in electronics modules 50.

Figure 2A:
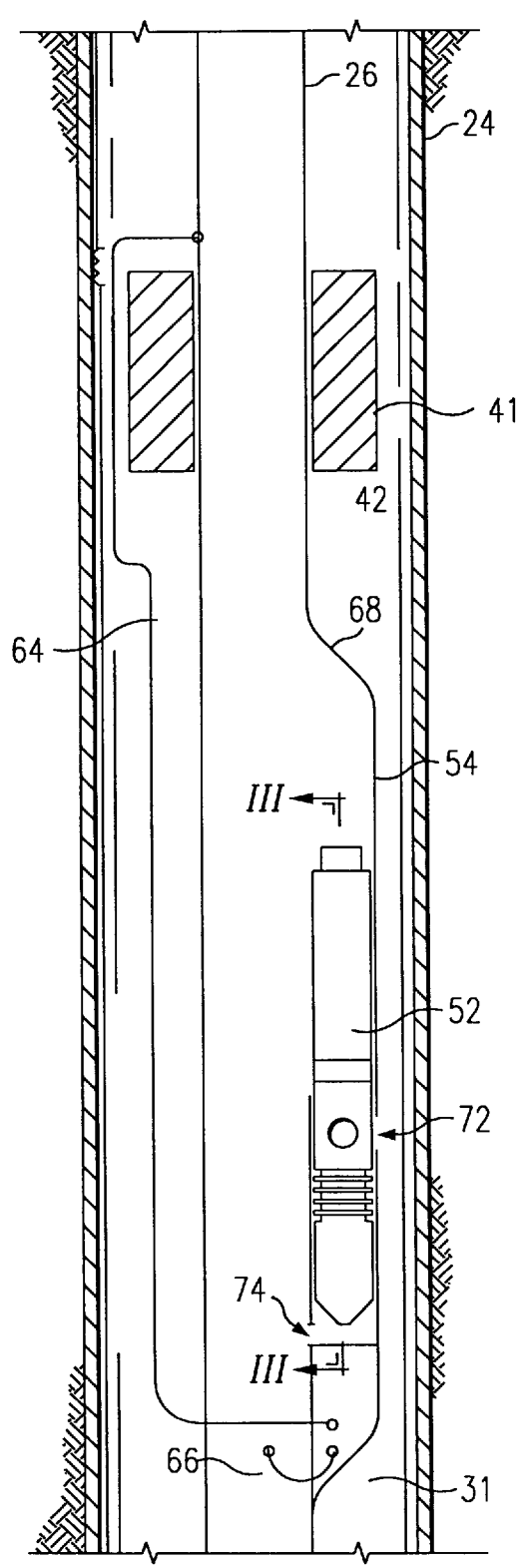
FIG. 2A is an enlarged schematic front view of a side pocket mandrel and a controllable gas lift valve, the valve having an internal electronics module and being wireline retrievable from the side pocket mandrel.

Referring now to FIG. 2a in the drawings, the downhole configuration of controllable valve 52, as well as the electrical connections with casing 24 and tubing string 26, is depicted. The pipe sections of tubing string 26 are conventional and where it is desired to incorporate a gas-lift valve in a particular pipe section, a side pocket mandrel 54, such as those made by Weatherford or Camco, is employed. Each side pocket mandrel 54 is a non-concentric enlargement of tubing string 26 that permits wireline retrieval and insertion of controllable valves 52 downhole.

Any centralizers located between upper and lower chokes 40, 42, must be constructed such as to electrically isolate casing 24 from tubing string 26.

A power and signal connector wire 64 electrically connects controllable valve 52 to tubing string 26 at a point above its associated choke 41. Connector 64 must pass outside the choke 41, as shown in FIG. 2A, for the choke to remain effective. A connector wire 66 provides an electrical return path from controllable valve 52 to tubing 26. Each valve 52 and its associated electronics module is powered and controlled using voltages generated on the tubing 26 by the action of chokes 41, 42.

It should be noted that the power supplied downhole tubing 26 and casing 24 is effective only for choke and control modules that are above the surface of any electrically conductive liquid that may be in annulus 31. Chokes and modules that are immersed in conductive liquid cease to receive signals since such liquid creates an electrical short-circuit between tubing and casing before the signals reach the immersed chokes and modules.

Use of controllable valves 52 is preferable for several reasons. Conventional bellows valves often leak when they should be closed during production, resulting in wasteful consumption of lift gas. Additionally, conventional bellows valves 50 are usually designed with an operating margin of about 200 psi per valve, resulting in less than full pressure being available for lift.

Figure 2B:
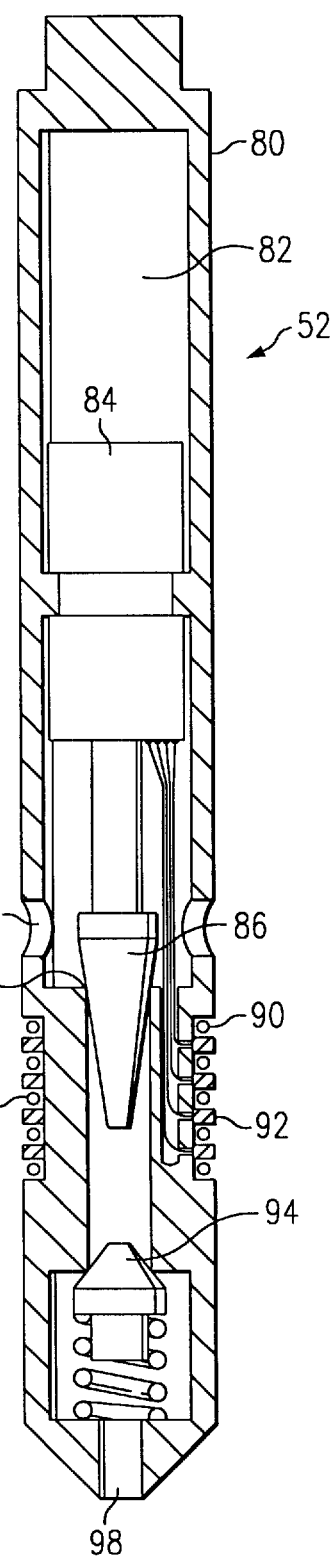
FIG. 2B is a cross sectional side view of the controllable gas lift valve of FIG. 2A taken at III—III.

Referring more specifically to FIGS. 2A and 2B, a more detailed illustration of controllable gas-lift valve 52 and side pocket mandrel 54 is provided. Side pocket mandrel 54 includes a housing 68 having a gas inlet port 72 and a gas outlet port 74. When controllable valve 52 is in an open position, gas inlet port 72 and gas outlet port 74 provide fluid communication between annular space 31 and an interior of tubing string 26. In a closed position, controllable valve 52 prevents fluid communication between annular space 31 and the interior of tubing string 26. In a plurality of intermediate positions located between the open and closed positions, controllable valve 52 meters the amount of gas flowing from annular space 31 into tubing string 26 through gas inlet port 72 and gas outlet port 74.

Controllable gas-lift valve 52 includes a generally cylindrical, hollow housing 80 configured for reception in side pocket mandrel 54. An electronics module 82 is disposed within housing 80 and is electrically connected to a stepper motor 84 for controlling the operation thereof. Operation of stepper motor 84 adjusts a needle valve head 86, thereby controlling the position of needle valve head 86 in relation to a valve seat 88. Movement of needle valve head 86 by stepper motor 84 directly affects the amount of fluid communication that occurs between annular space 31 and the interior of tubing string 26. When needle valve head 86 fully engages valve seat 88 as shown in FIG. 2B, the controllable valve 52 is in the closed position.

O-rings 90 are made of an elastomeric material and allow controllable valve 52 to sealingly engage side pocket mandrel 54. Slip rings 92 surround a lower portion of housing 80 and are electrically connected to electronics module 82. Slip rings 92 provide an electrical connection for power and communication between tubing string 26 and electronics module 82.

Controllable valve 52 includes a check valve head 94 disposed within housing 80 below needle valve head 86. An inlet 96 and an outlet 98 cooperate with inlet port 72 and outlet port 74 when valve 52 is in the open position to provide fluid communication between annulus 31 and the interior of tubing string 26. Check valve 94 insures that fluid flow only occurs when the pressure of fluid in annulus 31 is greater than the pressure of fluid in the interior of tubing string 26.

Figure 3:
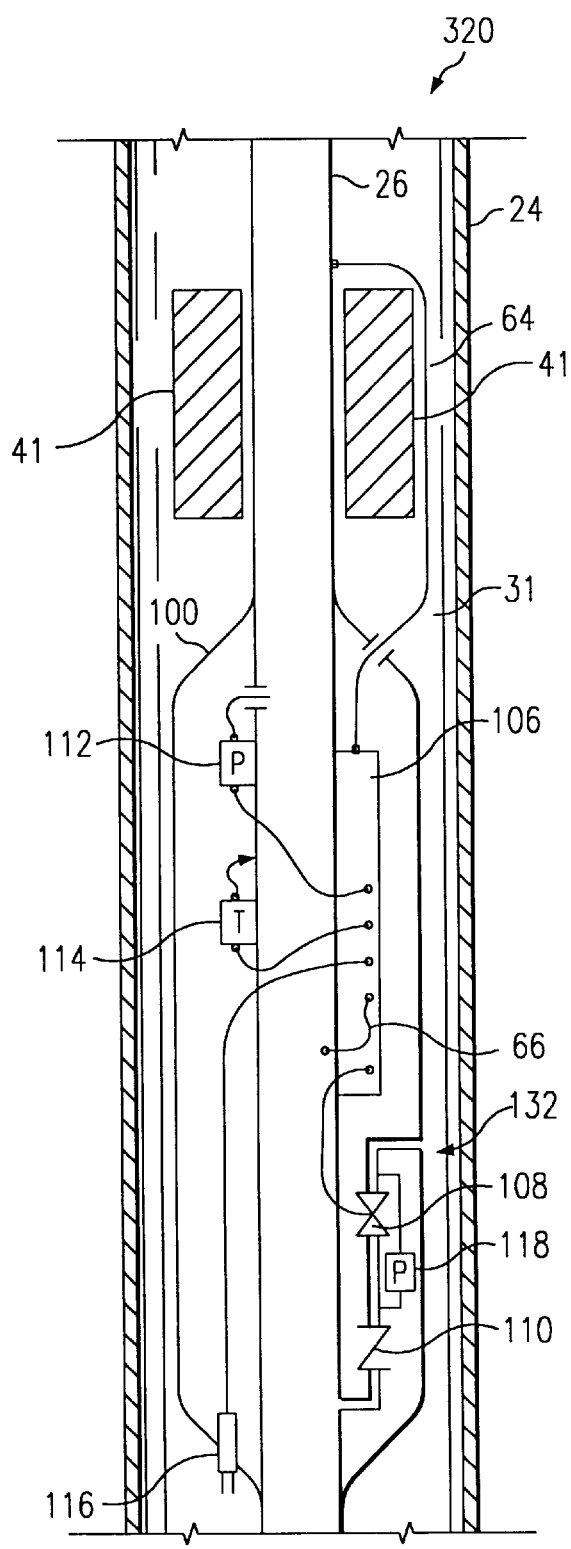
FIG. 3 is an enlarged schematic front view of the tubing string and casing of FIG. 1, the tubing string having an electronics module, sensors, and a controllable gas lift valve operatively connected to an exterior of the tubing string.

Referring to FIG. 3 in the drawings, an installation configuration for a controllable gas lift valve and its associated electronics support module is shown. In FIG. 3, tubing 26 includes an annularly enlarged pocket, or pod 100 formed on the exterior of tubing string 26. Enlarged pocket 100 includes a housing that surrounds and protects controllable gas lift valve 132 and an electronics module 106. In this mounting configuration, gas lift valve 132 is rigidly mounted to tubing string 26 and is not insertable and retrievable by wireline. Jumper 64 is fed through enlarged pocket 100 to connect electronics module 106 to the tubing above the choke 41 and thus receive power and communications signals, in conjunction with jumper 66 returned to the tubing below the choke. Electronics module 106 is rigidly connected to tubing string 26 and is not insertable or retrievable by wireline.

Controllable valve 132 includes a motorized needle valve head 108 and a check valve head 110 that are schematically illustrated in FIG. 2. The valve heads 108, 110 cooperate to control fluid communication between annular space 31 and the interior of tubing string 26.

A plurality of sensors are used in conjunction with electronics module 106 to control the operation of controllable valve 132 and gas lift well 320. Pressure sensors, such as those produced by Three Measurement Specialties, Inc., can be used to measure internal tubing pressure, internal pod housing pressures, and differential pressures across gas lift valves. In commercial operation, the internal pod pressure is considered unnecessary. A pressure sensor 112 is rigidly mounted to tubing string 26 to sense the internal tubing pressure of fluid within tubing string 26. A pressure sensor 118 is mounted within pocket 100 to determine the differential pressure across needle valve head 108. Both pressure sensor 112 and pressure sensor 118 are independently electrically coupled to electronics module 106 for receiving power and for relaying communications. Pressure sensors 112, 118 are potted to withstand the severe vibration associated with gas lift tubing strings.

Temperature sensors, such as those manufactured by Four Analog Devices, Inc. (e.g. LM-34), are used to measure the temperature of fluid within the tubing, Chousing pod, power transformer, or power supply. A temperature sensor 114 is mounted to tubing string 26 to sense the internal temperature of fluid within tubing string 26. Temperature sensor 114 is electrically coupled to electronics module 106 for receiving power and for relaying communications. The temperature transducers used downhole are rated for −50 to 300° F. and are conditioned by input circuitry to +5 to +255° F. The raw voltage developed at a power supply in electronics module 106 is divided in a resistive divider element so that 25.5 volts will produce an input to the analog/digital converter of 5 volts.

A salinity sensor 116 is also electrically connected to electronics module 106. Salinity sensor 116 is rigidly and sealingly connected to the housing of enlarged pocket 100 to sense the salinity of the fluid in annulus 31.

It should be understood that the embodiment illustrated in FIG. 3 could include or exclude any number of the sensors 112, 114, 116 or 118. Sensors other than those displayed could also be employed in either of the embodiments. These could include gauge pressure sensors, absolute pressure sensors, differential pressure sensors, flow rate sensors, tubing acoustic wave sensors, valve position sensors, or a variety of other analog signal sensors. Similarly, it should be noted that an electronics module similar to electronics module 106 could be packaged with various sensors and deployed independently of controllable valve 132.

Figure 4A:
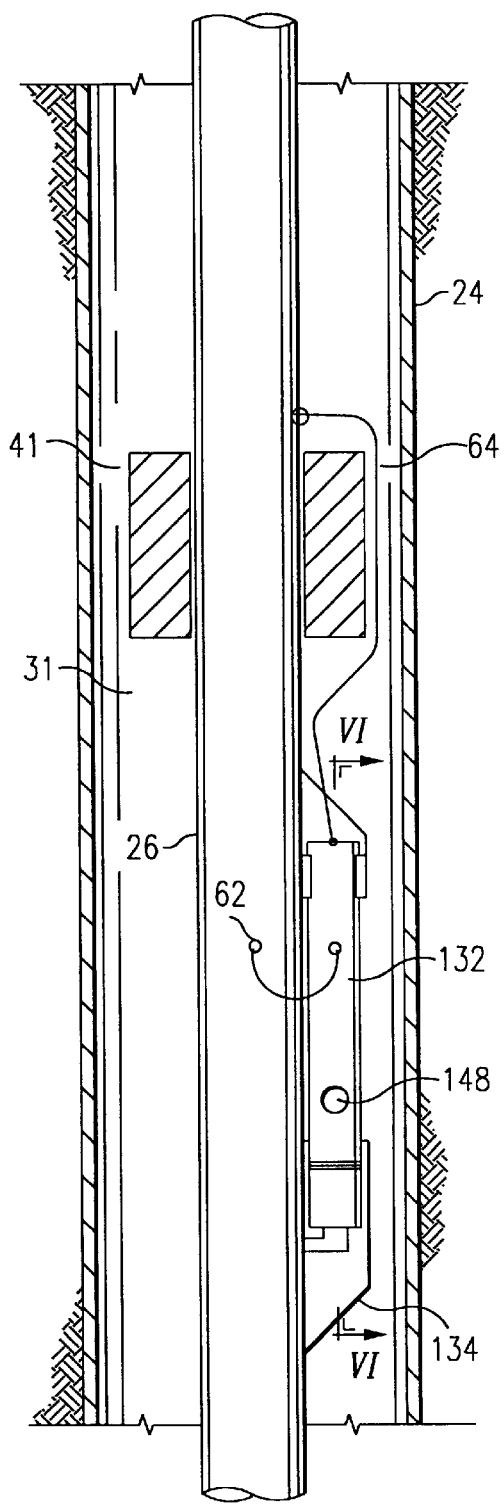
FIG. 4A is an enlarged schematic front view of the tubing string and casing of FIG. 1, the tubing string having a controllable gas lift valve permanently connected to the tubing string.
Figure 4B:
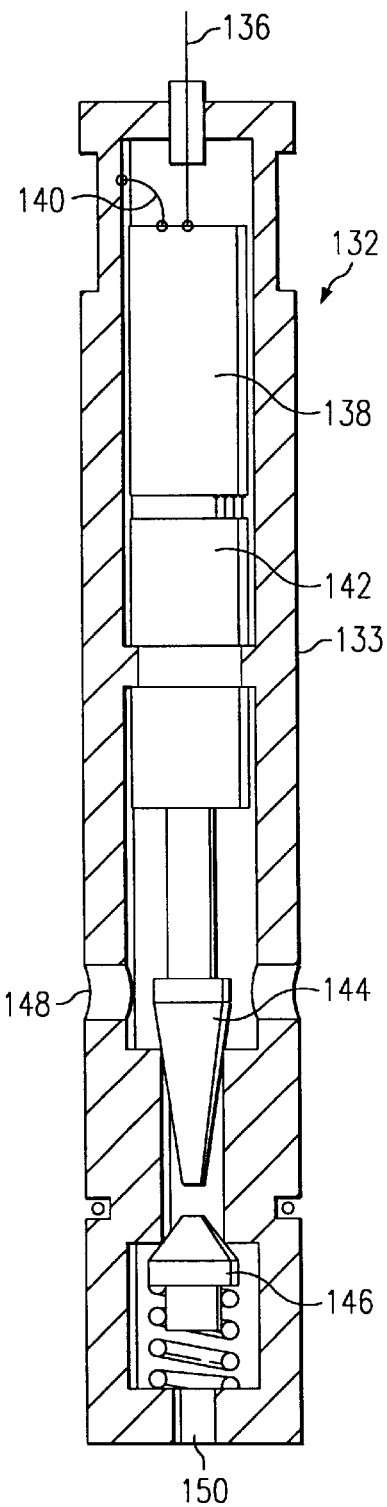
FIG. 4B is a cross sectional side view of the controllable gas lift valve of FIG. 6 taken at VI—VI.

Referring now to FIGS. 4A and 4B in the drawings, a controllable gas lift valve 132 having a valve housing 133 is mounted on a tubing conveyed mandrel 134. Controllable valve 132 is mounted similar to most of the bellows-type gas lift valves that are in use today. These valves are not wireline replaceable, and must be replaced by pulling tubing string 26. An electronics module 138 is mounted within housing 133 above a stepper motor 142 that drives a needle valve head 144. A check valve 146 is disposed within housing 133 below needle valve head 144. Stepper motor 142, needle valve head 144, and check valve 146 are similar in operation and configuration to those used in controllable valve 52 depicted in FIGS. 2A and 2B In similar fashion to FIG. 2B, an inlet port 148 and an outlet port 150 are furnished to provide a fluid communication path between annulus 31 and the interior of tubing string 26.

Power and communications are supplied to electronics module 138 by a power and signal connector 136 which connects by jumper 64 to the tubing above choke 41. Jumper 140 is connected between electronics module 138 and housing 133, thus being effectively connected to tubing string 26 below choke 41.

Although not specifically shown in the drawings, electronics module 138 could have any number of sensors electrically coupled to the module 138 for sensing downhole conditions. These could include pressure sensors, temperature sensors, salinity sensors, flow rate sensors, tubing acoustic wave sensors, valve position sensors, or a variety of other analog signal sensors. These sensors would be connected in a manner similar to that used for sensors 112, 114, 116, and 118 of FIG. 3.

Figure 5:
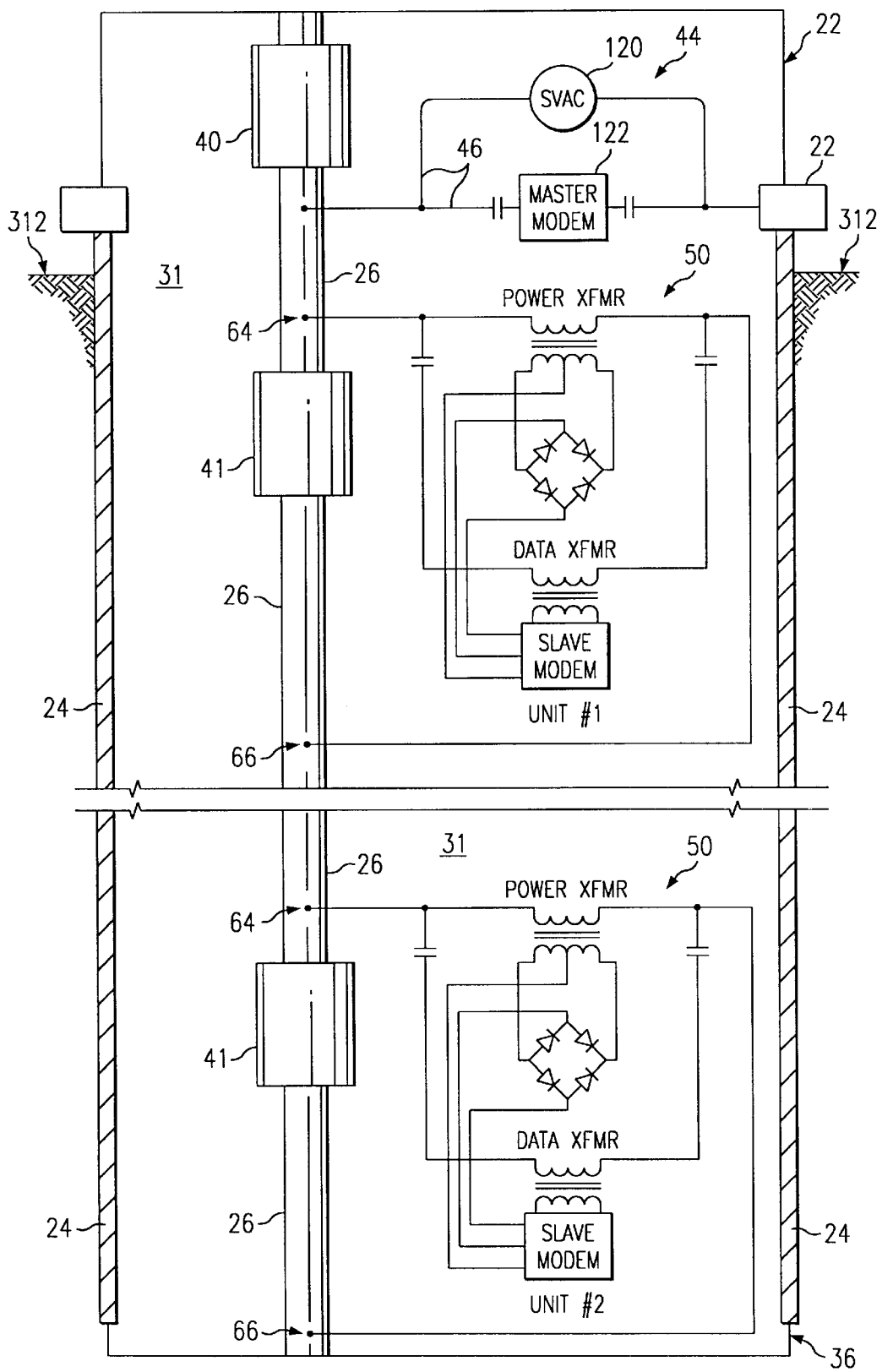
FIG. 5 is a schematic of an electrical equivalent circuit diagram for the controllable gas lift well of FIG. 1.

Referring now to FIG. 5 in the drawings, an equivalent circuit diagram for gas lift well is illustrated and should be compared to FIG. 1. Computer and power source 44 includes an AC power source 120 and a master modem 122 electrically connected between casing 24 and tubing string 26. Electronics modules 50 are independently and permanently mounted in an enlarged pocket on tubing string 26. Although not shown, the equivalent circuit diagram could also include depictions of electronics module 106 of FIG. 2.

For purposes of the equivalent circuit diagram of FIG. 5, it is important to note that although electronics modules 50 appear identical, they may contain or omit different components and combinations such as sensors 112, 114, 116, 118 of FIG. 3. Additionally, the electronics modules may or may not be an integral part of the controllable valve. Each electronics module includes a power transformer coupled to a diode bridge to generate DC which energizes the modem and other electronic components such as the valve motor controller. Each electronics module also contains a data transformer which is capacitively coupled to the input/output of the slave modem slave modem.

Figure 6:
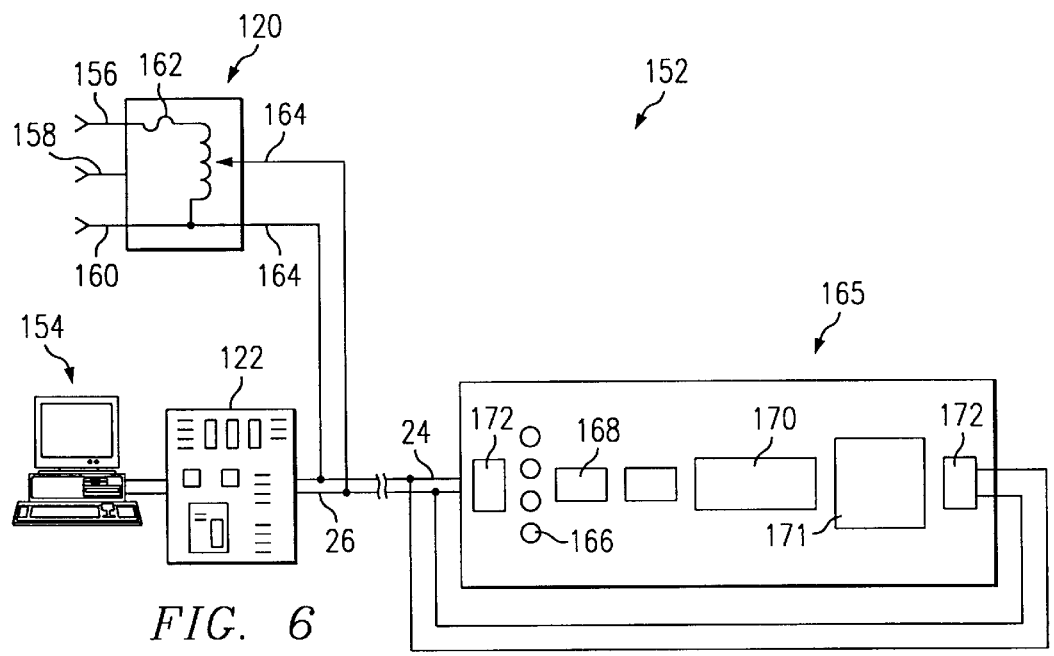
FIG. 6 is a schematic diagram depicting a surface computer electrically coupled to an electronics module of the gas lift well of FIG. 1.

Referring to FIG. 6 in the drawings, a block diagram of a communications system 152 according to the present invention is illustrated. FIG. 6 should be compared and contrasted with FIGS. 1 and 5. Communications system 152 includes master modem 122, AC power source 120, and a computer 154. Computer 154 is coupled to master modem 122, preferably via an RS232 bus, and runs a multitasking operating system such as Windows NT and a variety of user applications. AC power source 120 includes a 120 volt AC input 156, a ground 158, and a neutral 160 as illustrated. Power source 120 also includes a fuse 162, preferably 7.5 amp, and has a transformer output 164 at approximately 6 volts AC and 60 Hz. Power source 120 and master modem 122 are both connected to casing 24 and tubing 26.

Communications system 152 includes an electronics module 165 that is analogous to module 50 in FIG. 1, and module 106 in FIG. 3. Electronics module 165 includes a power supply 166 and an analog-to-digital conversion module 168. A programmable interface controller (PIC) 170 is electrically coupled to a slave modem 171 (analogous to slave modem of FIG. 5). Couplings 172 are provided for coupling electronics module 165 to casing 24 and tubing 26.

Figure 7:
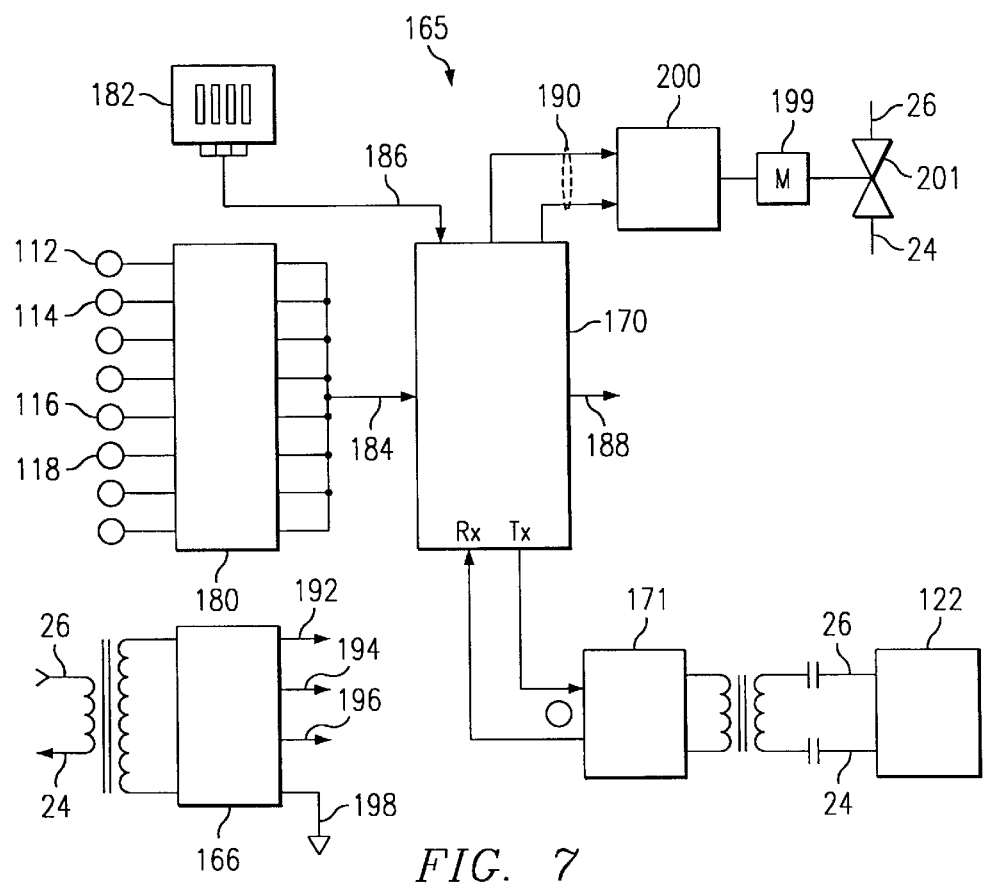
FIG. 7 is a system block diagram of the electronics module of FIG. 6.

Referring to FIG. 7 in the drawings, electronics module 165 is illustrated in more detail. Amplifiers and signal conditioners 180 are provided for receiving inputs from a variety of sensors such as tubing temperature, annulus temperature, tubing pressure, annulus pressure, lift gas flow rate, valve position, salinity, differential pressure, acoustic readings, and others. Some of these sensors are analogous to sensors 112, 114, 116, and 118 shown in FIG. 3. Preferably, any low noise operational amplifiers are configured with non-inverting single ended inputs (e.g. Linear Technology LT1369). All amplifiers 180 are programmed with gain elements designed to convert the operating range of an individual sensor input to a meaningful 8 bit output. For example, one psi of pressure input would produce one bit of digital output, 100 degrees of temperature will produce 100 bits of digital output, and 12.3 volts of raw DC voltage input will produce an output of 123 bits. Amplifiers 180 are capable of rail-to-rail operation.

Electronics module 165 is electrically connected to master modem 122 at the surface via casing 24 and tubing string 26. Address switches 182 are provided to address a particular device from master modem 122. As shown in FIG. 7, 4 bits of addresses are switch selectable to form the upper 4 bits of a full 8 bit address. The lower 4 bits are implied and are used to address the individual elements within each electronics module 165. Thus, using the configuration illustrated, sixteen modules are assigned to a single master modem 122 on a single communications line. As configured, up to four master modems 122 can be accommodated on a single communications line.

Electronics module 165 also includes PIC 170, which preferably has a basic clock speed of 20 MHz and is configured with 8 analog-to-digital inputs 184 and 4 address inputs 186. PIC 170 includes a TTL level serial communications UART 188, as well as a stepper motor controller interface 190.

Electronics module 165 also contains a power supply 166. A nominal 6 volts AC line power is supplied to power supply 166 along tubing string 26. Power supply 166 converts this power to plus 5 volts DC at terminal 192, minus 5 volts DC at terminal 194, and plus 6 volts DC at terminal 196. A ground terminal 198 is also shown. The converted power is used by various elements within electronics module 165.

Although connections between power supply 166 and the components of electronics module 165 are not shown, the power supply 166 is electrically coupled to the following components to provide the specified power. PIC 170 uses plus 5 volts DC, while slave modem 171 uses plus and minus 5 volts DC. A stepper motor 199 (analogous to stepper motor 84 of FIG. 2B and stepper motor 142 of FIG. 4B) is supplied with plus 6 volts DC from terminal 196. Power supply 166 comprises a step-up transformer for converting the nominal 6 volts AC to 7.5 volts AC. The 7.5 volts AC is then rectified in a full wave bridge to produce 9.7 volts of unregulated DC current. Three-terminal regulators provide the regulated outputs at terminals 192, 194, and 196 which are heavily filtered and protected by reverse EMF circuitry. Modem 171 is the major power consumer in electronics module 165, typically using 350+milliamps at plus/minus 5 volts DC when transmitting.

Modem 171 is a digital spread spectrum modem having an IC/SS power line carrier chip set such as models EG ICS1001, ICS1002 and ICS1003 manufactured by National Semiconductor. Modem 171 is capable of 300–3200 baud data rates at carrier frequencies ranging from 14 kHz to 76 kHz. U.S. Pat. No. 5,488,593 describes the chip set in more detail and is incorporated herein by reference. While they are effective and frequently employed in applications such as this, spread-spectrum communications are not a necessity and other communication methods providing adequate bandwidth would serve equally well.

PIC 170 controls the operation of stepper motor 199 through a stepper motor controller 200 such as model SA1042 manufactured by Motorola. Controller 200 needs only directional information and simple clock pulses from PIC 170 to drive stepper motor 199. An initial setting of controller 200 conditions all elements for initial operation in known states. Stepper motor 199, preferably a MicroMo gear head, positions a rotating stem control needle valve 201 (analogous to needle valve heads 86 of FIG. 2B and 144 of FIG. 4B), which is the principal operative component of the controllable gas lift valve. Stepper motor 199 provides 0.4 inch-ounce of torque and rotates at a maximum of 500 steps per second. A complete revolution of stepper motor 199 consists of 24 individual steps. The output of stepper motor 199 is directly coupled to a 989:1 gear head which produces the necessary torque to open and close needle valve 201. The continuous rotational torque required to open and close needle valve 201 is 3 inch-pounds with 15 inch-pounds required to seat and unseat the valve 201.

PIC 170 communicates through digital spread spectrum modem 171 to master modem 122 via casing 24 and tubing string 26. PIC 170 uses a MODBUS 584/985 PLC communications protocol. The protocol is ASCII encoded for transmission.

The present invention makes use of an electronics module and a combination of sensors to provide valuable information about the downhole characteristics of a well. Sensors such as sensors 112, 114, 116, and 118 of FIG. 3 are used with electronics modules similar to those illustrated in FIGS. 3, 6 and 7.

It will be apparent to those skilled in the art that the systems and methods defined by reference to FIGS. 1–7 may be applied in alternative embodiments.

Figure 8:
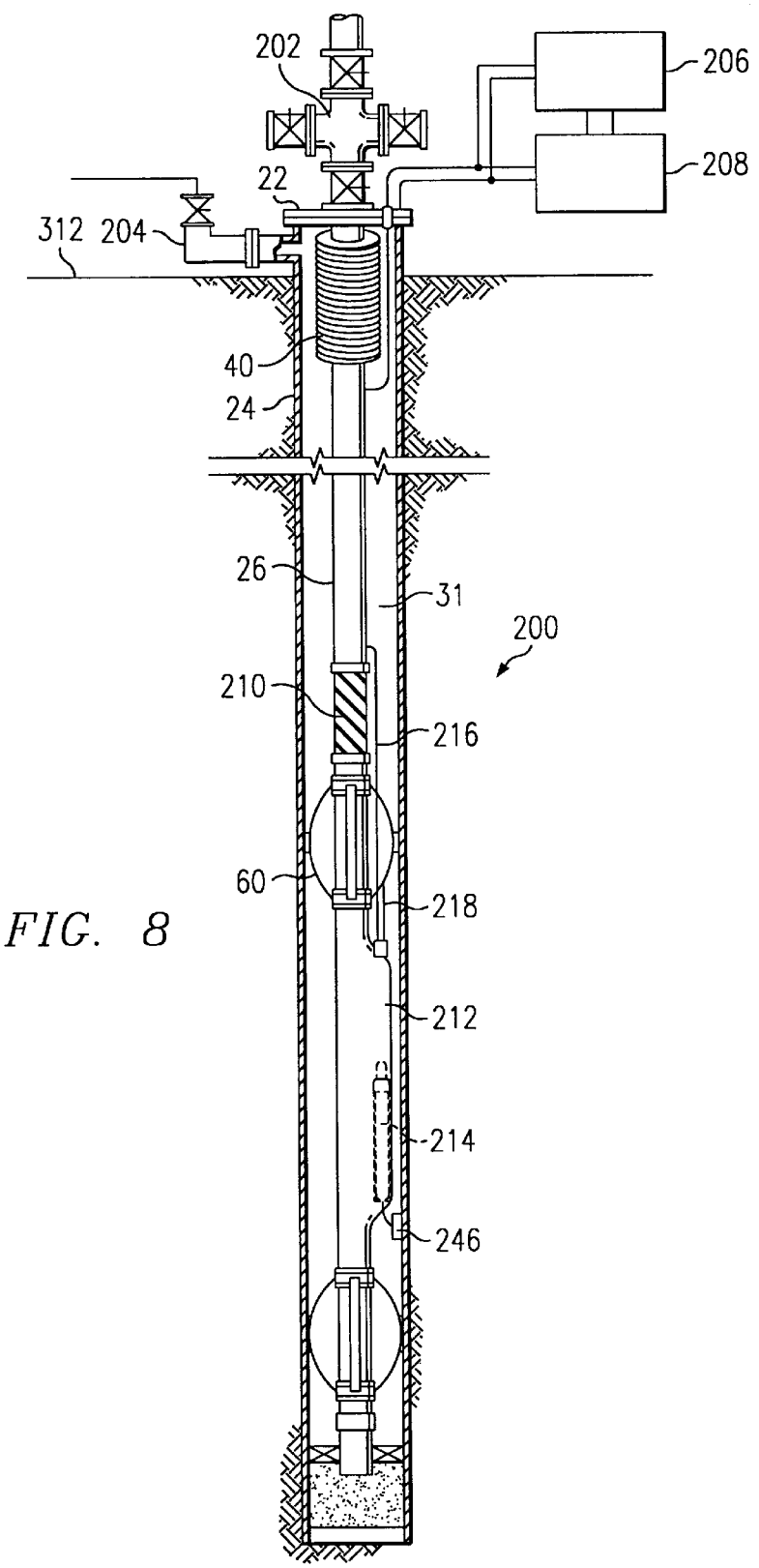
FIG. 8 is a schematic front view of a petroleum well having a data monitoring pod and sensors inserted in a side pocket mandrel according to the present invention.

Referring now to FIGS. 8 and 9 in the drawings, well 200 is different than petroleum well 320 of FIG. 1. Well 200 includes a conventional wellhead 202 at the surface 12 above hanger 22. Gas inlet valve 204 is fluidly connected to annulus 31 for injecting compressed gas between tubing string 26 and casing 24. Those skilled in the art will appreciate that surfactants and other chemicals can be injected through gas inlet valve 204 into the well. An upper ferromagnetic choke 40 is disposed between casing 24 and tubing string 26 below the casing hanger 22 to impede current flows as previously explained. An electrically isolated tubing section 210 is provided as an alternative to a lower ferromagnetic choke. Since tubing section 210 acts an impedance to current flow, a power and communications path is established in a section of tubing string 26 between upper choke 40 and tubing section 210.

Petroleum well 200 has one or more data monitoring pods, or electronics modules 214 on tubing string 26, the number and type of each pod depending on the requirements of the individual well 200. Each of the data monitoring pods 214 are individually addressable via wireless spread spectrum communication through tubing string 26 and casing 24. A master surface modem 206 and an AC low voltage power supply 208 are electrically connected to tubing string 26 below upper choke 40 to power and communicate with sensors and the data monitoring pods 214 downhole.

Well 200 includes a side pocket mandrel 212 integrally coupled to tubing string 26 downhole. Data monitoring pod 214 has a housing 215 and is electrically coupled to tubing section 26 between upper choke 40 and isolated tubing section 210. This connection is schematically illustrated as an insulated wire 216. A grounding lead 218 is connected to bow spring centralizer 60 for grounding data monitoring pod 214 to casing 24 as shown. Preferably, data monitoring pod 214 is wireline insertable and retrievable in side pocket mandrel 212 using conventional slick-line methods. Data monitoring pod 214 is connected to the side pocket mandrel 212 by slip rings to provide power and communication connections between the housing of the mandrel 212 and the data monitoring pod 214.

Figure 10:
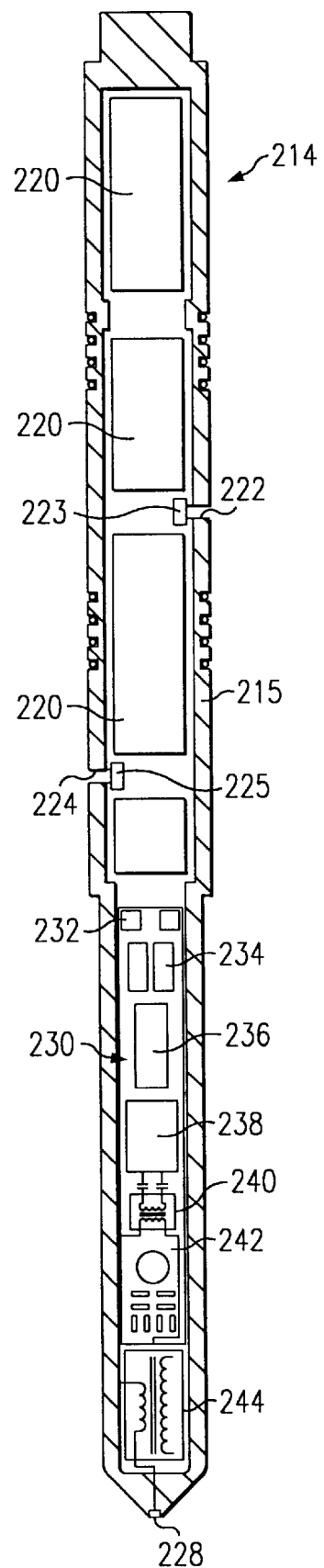
FIG. 10 is a cross sectional front view of the data monitoring pod and sensors of FIG. 9.

Referring still to FIGS. 8 and 9 in the drawings, but also to FIG. 10, the disposition of data monitoring pod 214 in side pocket mandrel 212 is illustrated in more detail. In a preferred form, one or more sensors are coupled to data monitoring pod 214, similar to the electronic sensors illustrated in FIG. 3. Data monitoring pod 214 includes electronics for a sensor package 220 that measures physical conditions in the well bore such as seismic conditions, acoustic conditions, pressure conditions, temperature conditions, and others. An annulus pressure port 222 and transducer 223 are disposed in housing 215 of data monitoring pod 214 for sensing the pressure of the annulus fluid, i.e., the fluid between casing 24 and tubing string 26. Other measurements of specific characteristics of the annulus fluid can easily be made through annulus pressure port 222 such as temperature via the transducer 223 as shown. In similar fashion, a tubing pressure port 224 and transducer 225 are disposed in housing 215 for sensing the fluid pressure inside tubing 26. Other physical characteristics of the tubing fluid can also be made through tubing pressure port 224.

Data monitoring pod 214 is slidably received within the cylindrical bore of side pocket mandrel 212 such that a stepped portion of housing 215 is in abutting engagement with a landing shoulder 226. As mentioned previously, data monitoring pod is insertable and retrievable by wireline. After installation in side pocket mandrel 212, a ground pin feed-through at 228 forms an electrical connection between mandrel 212 and data monitoring pod 214.

Referring more specifically to FIG. 10, data monitoring pod 214 is illustrated in more detail. A power and communication circuits board 230 includes sensor inputs 232 for connecting to sensor packages 220 (connection not shown) so that physical data such as pressure, temperature, acoustic, and seismic data can be measured. The input signals are conditioned at a signal conditioner 234 before transfer to a programmable interface controller (PIC) 236. A spread-spectrum modem 238 connects to tubing string 26 though a modem coupling network 240. A power supply transformer 244 is adapted for receiving low voltage AC power along tubing string 26 and is electrically connected to a DC power supply 242.

Referring again to FIG. 8 in the drawings, and also to FIG. 10, well 200 includes a geophone 246, which is operatively attached to casing 24 with its power and communication leads connected to data monitoring pod 214 through a pressure seal in side pocket mandrel 212. A rubber hanger 248 operates as an acoustic end coupler to connect geophone 246 to electronics module 214. A spring steel bracket 250 provides the mechanical force to impinge geophone 246 on casing 24. The ground and geophone electromagnetic wiring (not shown) is passed through a feed-through 252 and is electrically connected to data monitoring pod 214.

Master modem 206 at surface 312 and an associated controller communicate to one or more slave modems 238 located in or adjacent to each data monitoring pod 214. Data monitoring pod 214 and slave modem 238 report measurements from the various sensors downhole to master modem 206 via tubing string 26 and casing 24. A surface computer (not shown) continuously combines and analyzes downhole data as well as surface data to compute a real-time tubing pressure profile. Many uses of this data from the sensors are possible. For example, an optimal gas lift flow rate for each controllable gas lift valve may be computed from this data. Preferably pressure measurements are taken on locations uninfluenced by gas lift injection turbulence. Acoustic sensors (sounds less than 10 kilohertz) listen for tubing bubble patterns. Data is sent via slave modem 238 directly to surface modem 206. Alternatively, data can be sent to a mid-hole data monitoring pod 214 and relayed to the surface computer.

Even though many of the examples discussed herein are applications of the present invention in petroleum wells, the present invention also can be applied to other types of wells, including but not limited to water wells and natural gas wells.

One skilled in the art will see that the present invention can be applied in many areas where there is a need to provide sensors, power, and communication within a borehole, well, or any other area that is difficult to access. Also, one skilled in the art will see that the present invention can be applied in many areas where there is an already existing conductive piping structure and a need to route power and communications to sensors in a same or similar path as the piping structure. A water sprinkler system or network in a building for extinguishing fires is an example of a piping structure that may be already existing and may have a same or similar path as that desired for routing power and communications to a plurality of sensors. In such case another piping structure or another portion of the same piping structure may be used as the electrical return. The steel structure of a building may also be used as a piping structure and/or electrical return for transmitting power and communications to sensors in accordance with the present invention. The steel rebar in a concrete dam or a street may be used as a piping structure and/or electrical return for transmitting power and communications to sensors in accordance with the present invention. The transmission lines and network of piping between wells or across large stretches of land may be used as a piping structure and/or electrical return for transmitting power and communications to sensors in accordance with the present invention. Surface refinery production pipe networks may be used as a piping structure and/or electrical return for transmitting power and communications to sensors in accordance with the present invention. Thus, there are numerous applications of the present invention in many different areas or fields of use.

It should be apparent from the foregoing that an invention having significant advantages has been provided. While the invention is shown in only a few of its forms, it is not just limited but is susceptible to various changes and modifications without departing from the spirit thereof.

What is claimed is:

1. A petroleum well having a wellbore extending in the earth and electrically conductive tubing string disposed in the wellbore and not electrically insulated for a substantial portion thereof, characterized by an induction choke coupled to the tubing string and one or more devices electrically coupled to the tubing string in the wellbore for wireless reception of a time-varying electrical signal applied to the piping structure wherein the induction choke acts as a series impedance to the time-varying electrical signal and at least one device is operable for sensing or controlling a physical characteristic in or proximate the wellbore.

2. The petroleum well in accordance with claim 1, wherein the signal is a communication signal for communicating with a device.

3. The petroleum well in accordance with claim 1, wherein the signal is a power signal for powering a device.

4. The petroleum well in accordance with claim 1, wherein the device is a sensor for sensing a physical characteristic in the wellbore.

5. The petroleum well in accordance with claim 1, wherein the device is a valve which operates when commanded by a wireless signal applied to the piping structure.

6. The petroleum well in accordance with claim 1, wherein the petroleum well is a gas lift well, the piping structure includes tubing and one device is a gas lift valve coupled to the tubing and adjustable to regulate the fluid flow between the interior and exterior of the tubing.

7. The petroleum well in accordance with claim 1, including an induction choke located proximate a portion of the piping structure to route the time varying signal within the piping structure.

8. The petroleum well in accordance with claim 1, including a plurality of devices each adapted to send and receive communication signals for communicating with other devices in different regions of the well.

9. The petroleum well in accordance with claim 1, including a master controller and some of the devices being sensors and at least one device being a valve, whereby the operation of the valve is determined by the controller based on input from the sensors.

10. In a petroleum well having a wellbore extending in the earth and electrically conductive piping structure disposed in the wellbore and having an induction choke coupled thereto, a method of operating the wellbore characterized by applying a time varying electrical signal to the piping structure, impeding the time-varying electrical signal with the induction choke, and operating one or more wireless devices electrically coupled to the piping structure in the wellbore to effect the operation of at least one device in the earth.

11. The method of claim 10, a device comprising a sensor, the method including sensing a physical characteristic and communicating such physical characteristic along the piping structure.

12. The method of claim 10, wherein a time varying power signal and a time varying communication signal is applied to the piping structure to power and communicate with a number of devices.

13. The method of claim 10, wherein the petroleum well is a gas-lift well and at least one device is a controllable valve, including communicating with the valve and regulating the fluid flow through the valve.

14. The method of claim 13, including controlling the operation of the gas-lift well.

15. The method of claim 14, wherein the operation includes the unloading, kickoff, or production of the well.

16. A petroleum well comprising:
  a) a surface modem;
  b) a wellbore;
  c) a tubing positioned and longitudinally extending within the wellbore;
  d) an induction choke coupled to the tubing proximate the surface;
  e) a source of alternating current coupled to the tubing; and
  f) an electronics module coupled to the tubing and having a downhole modem and one or more sensors positioned for sensing a downhole physical characteristic,
    the download modem communicating with the surface modem via said alternating current using the tubing as a conductor.

17. The petroleum well of claim 16, one of the sensors comprising a temperature sensor.

18. The petroleum well of claim 16, one of the sensors comprising a pressure sensor.

19. The petroleum well of claim 16, one of the sensors comprising an acoustic sensor.

20. The petroleum well of claim 16, including a computer coupled to the surface modem for communicating with the electronics module.

* * * * *